(12) United States Patent
Yu

(10) Patent No.: US 7,826,154 B2
(45) Date of Patent: Nov. 2, 2010

(54) PORTABLE ELECTRONIC DEVICE

(75) Inventor: Sheng-Jung Yu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 271 days.

(21) Appl. No.: 12/139,077

(22) Filed: Jun. 13, 2008

(65) Prior Publication Data

US 2008/0316619 A1    Dec. 25, 2008

(51) Int. Cl.
G02B 7/02 (2006.01)
(52) U.S. Cl. .................... 359/811; 359/819
(58) Field of Classification Search .......... 359/811, 359/819
See application file for complete search history.

(56) References Cited

U.S. PATENT DOCUMENTS 7,009,781 B2 *  3/2006  Oshima et al. .............. 359/697

\* cited by examiner

*Primary Examiner*—Ricky L Mack
*Assistant Examiner*—James C Jones
(74) *Attorney, Agent, or Firm*—Andrew C. Cheng

(57) ABSTRACT

An exemplary portable electronic device includes a main body, a first camera module disposed in the main body, a second camera module disposed in the main body adjacent to the first camera module, and a light diverging lens rotatably mounted on the main body. The light diverging lens has a first surface and an opposite second surface. The light diverging lens is rotatable between a first position and a second position. When the light diverging lens is in the first position, the light diverging lens is optically aligned with the first camera module and the first surface of the light diverging lens faces the first camera module. When the light diverging lens is in the second position, the light diverging lens is optically aligned with the second camera module and the second surface of the light diverging lens faces the second camera module.

16 Claims, 4 Drawing Sheets

PORTABLE ELECTRONIC DEVICE

BACKGROUND

1. Technical Field

The present invention relates to portable electronic devices, particularly, to a portable electronic device capable of taking wide angle images.

2. Description of Related Art

With the development of the optical imaging technology, camera modules are widely used in a variety of portable electronic devices, such as mobile phones, and personal digital assistants (PDAs).

Some portable electronic devices, for example, third generation (3G) mobile phones, usually include two cameras: a first camera module and a second camera module. The first camera module is configured for taking photographs, while the second camera module is mainly configured for video communication. However, view angle of the first camera module is generally not large enough (e.g., 60° to 65°). Therefore, such portable electronic devices are not suitable for taking wide angle images.

Therefore, a new portable electronic device is desired to overcome the above mentioned problems.

SUMMARY

An exemplary portable electronic device includes a main body, a first camera module disposed in the main body, a second camera module disposed in the main body adjacent to the first camera module, and a light diverging lens rotatably mounted on the main body. The light diverging lens has a first surface and an opposite second surface. The light diverging lens is rotatable between a first position and a second position. When the light diverging lens is in the first position, the light diverging lens is optically aligned with the first camera module and the first surface of the light diverging lens faces the first camera module. When the light diverging lens is in the second position, the light diverging lens is optically aligned with the second camera module and the second surface of the light diverging lens faces the second camera module.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings.

Figure 1:
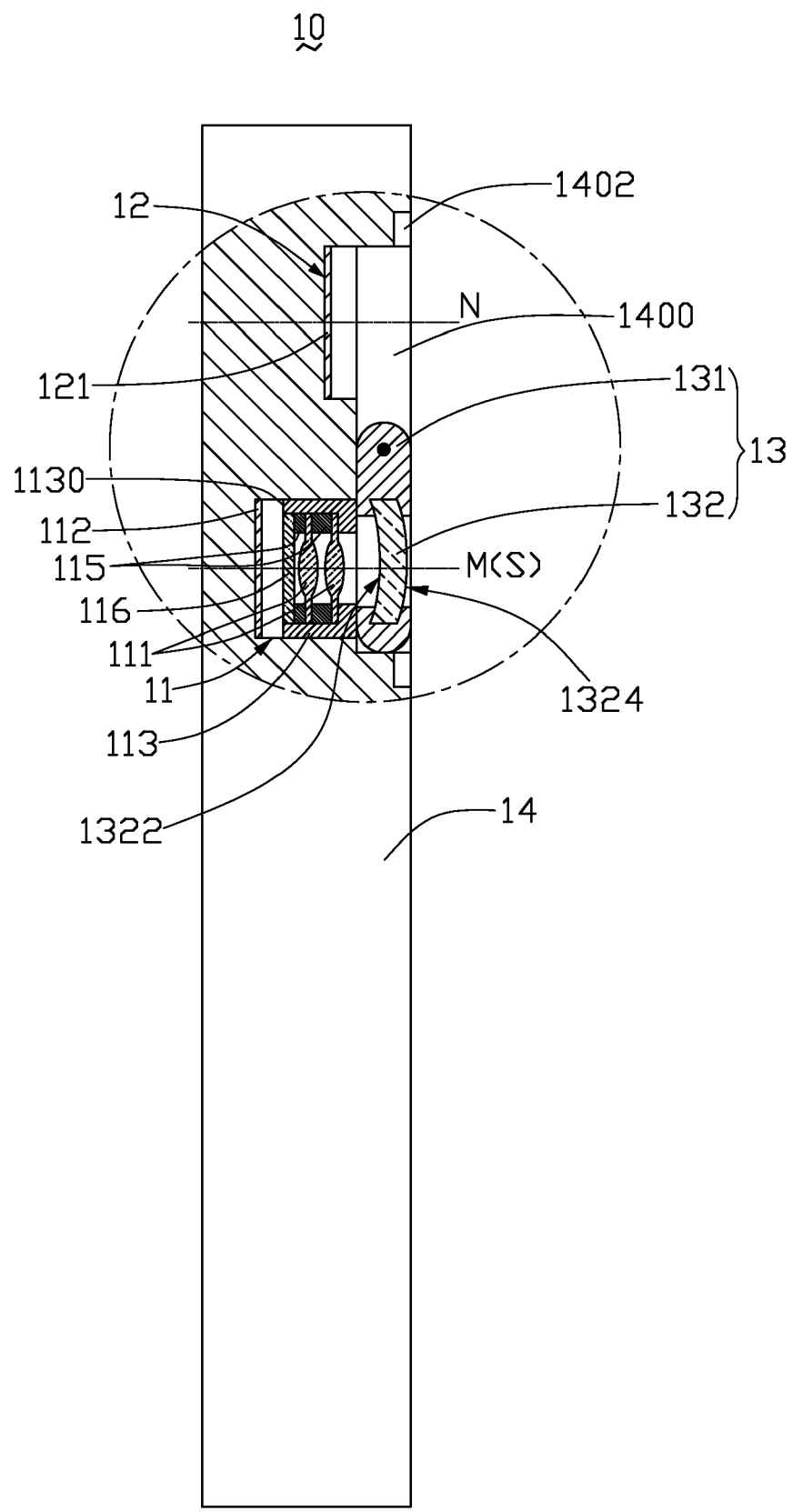
FIG. 1 is a schematic, side plan, partially cutaway view of a portable electronic device according to an exemplary embodiment, showing a light diverging lens is in optical alignment with a first camera module.

Referring to FIG. 1, a portable electronic device 10 of an exemplary embodiment is shown. The portable electronic device 10 includes a main body 14, a first camera module 11, a second camera module 12, and a rotatable module 13.

The first camera module 11 includes a first image sensor 112, a barrel 113, a lens group 111, an infrared-cut filter 116, and spacers 115. The lens group 111, the infrared-cut filter 116 and the spacers 115 are received in the barrel 113. The lens group 111 is coaxially aligned with the first image sensor 112. One of the spacers 115 is sandwiched between two lenses of the lens group 111, and the other of the spacers 115 is sandwiched between the lens group 111 and the infrared-cut filter 116. The infrared-cut filter 116 is positioned between the lens group 111 and the first image sensor 112. The first camera module 11 may have a resolution of more than one million pixels. The first image sensor 112 can be a charge coupled device (CCD) sensor or a complementary metal oxide (CMOS) sensor. The second camera module 12 includes a second image sensor 121. The second image sensor 121 can be a CCD sensor or a CMOS sensor.

The rotatable module 13 is arranged on the main body 14. In this embodiment, the rotatable module 13 includes a pin jointed structure 131 and a light diverging lens 132 mounted in the pin-jointed structure 131. The pin-jointed structure 131 is mounted on the main body 14, and is rotatable relative to the main body 14 in such a manner that the light diverging lens 132 can be selectively in optical alignment with the first camera module 11 or the second camera module 12. The light diverging lens 132 includes a first surface 1322 and an opposite second surface 1324. In this embodiment, the light diverging lens 132 is an aspherical lens. In one typical example, the light diverging lens 132 can be a concave lens. The light diverging lens 132 can be made of glass or plastic.

The main body 14 defines a first recess 1400 and two second recesses 1402 therein. The first recess 1400 is configured (i.e., structured and arranged) for accommodating the rotatable module 13. The second recesses 1402 are configured for allowing a user of the portable electronic device 10 to insert a finger (not shown) therein, thus rotating the rotatable module 13.

Figure 2:
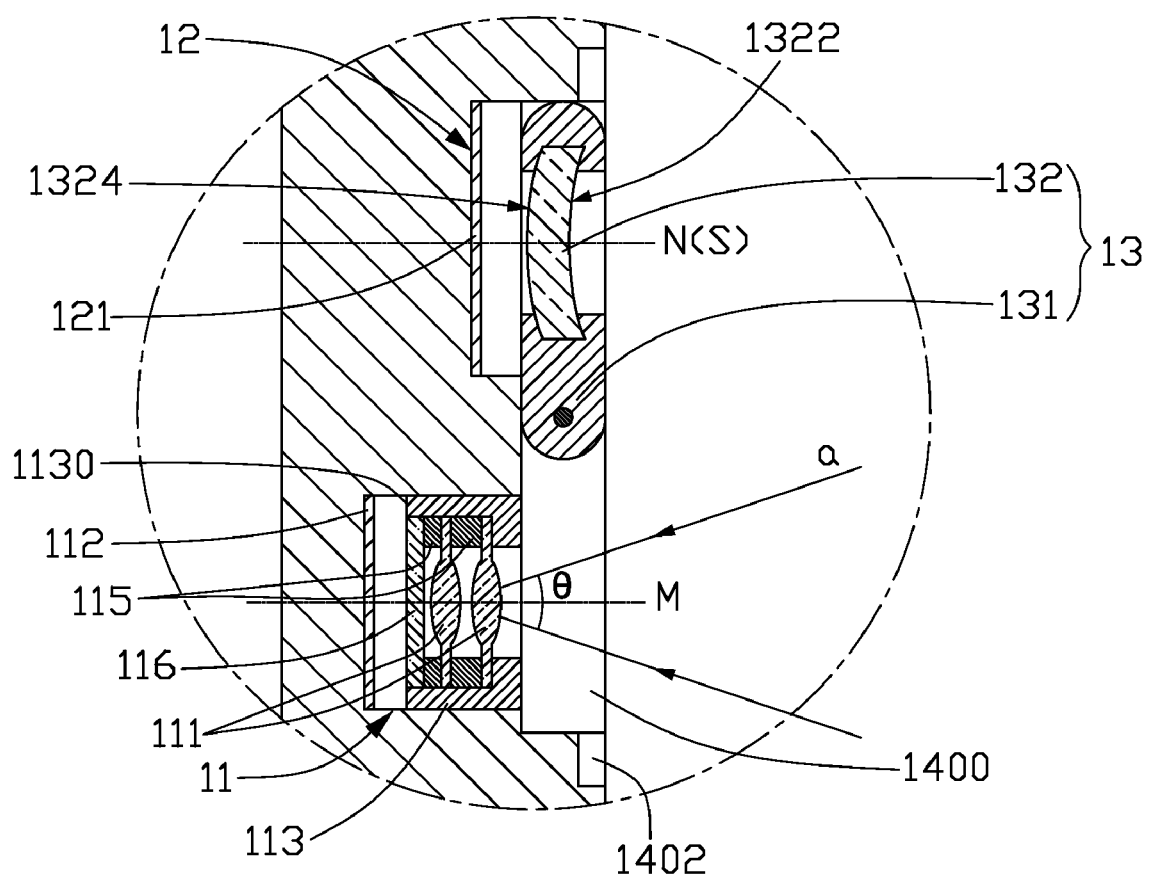
FIG. 2 is an enlarged sectional view of a the cutaway portion of FIG. 1, but showing the light diverging lens in optical alignment with a second camera module, and showing light paths thereof.
Figure 3:
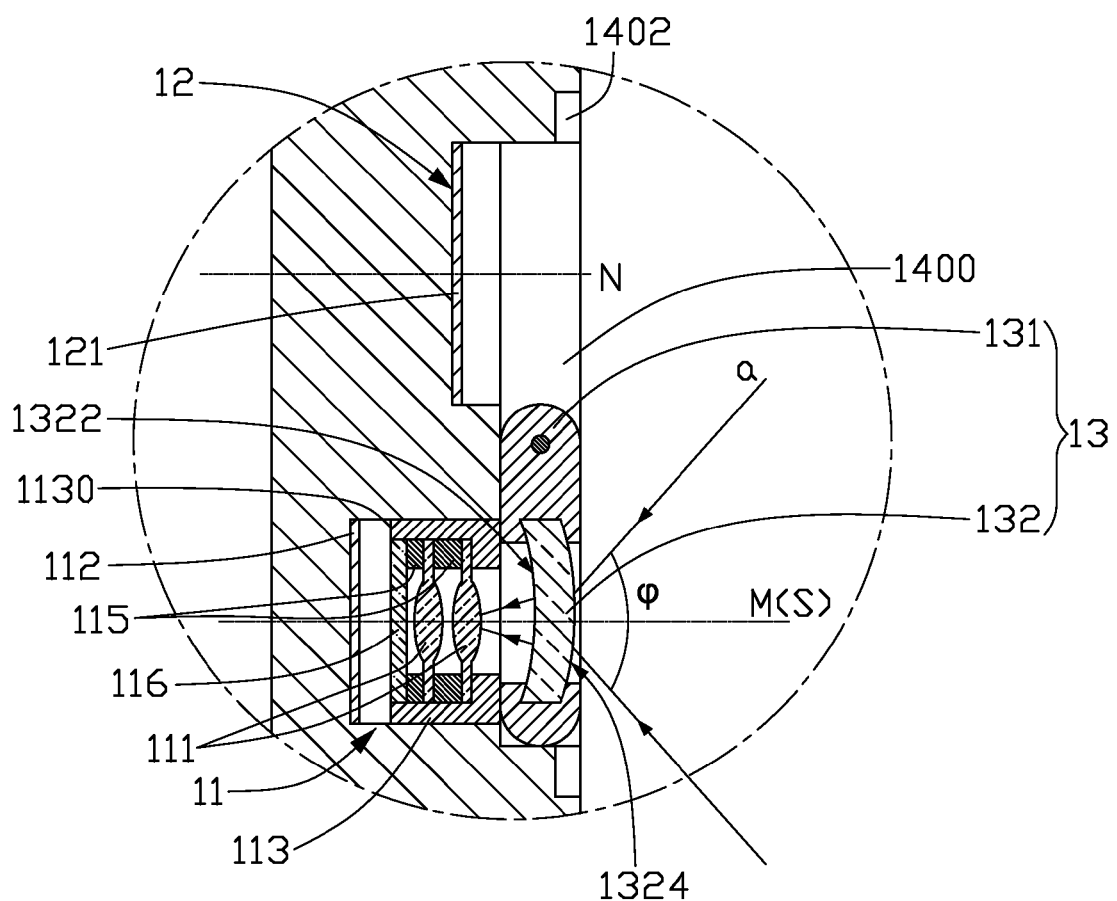
FIG. 3 is an enlarged sectional view of the cutaway portion of FIG. 1, showing light paths thereof.

Referring to FIG. 2, a view angle of the first camera module 11 is θ. Generally, θ is in an approximate range from 55° to 65°. Referring to FIG. 3, when the light diverging lens 132 is in optical alignment with the first camera module 11 (i.e., an optical axis S of the light diverging lens 132 aligns with an optical axis M of the first camera module 11), the first surface 1322 of the light diverging lens 132 faces the first camera module 11, and the view angle of the first camera module 11 is φ. Generally, φ is in an approximate range from 120° to 160°. Therefore, with the light diverging lens 132 being in optical alignment the first camera module 11, the view angle of the first camera module 11 is greatly increased. Accordingly, the first camera module 11 is capable of capturing wider angle images.

Figure 4:
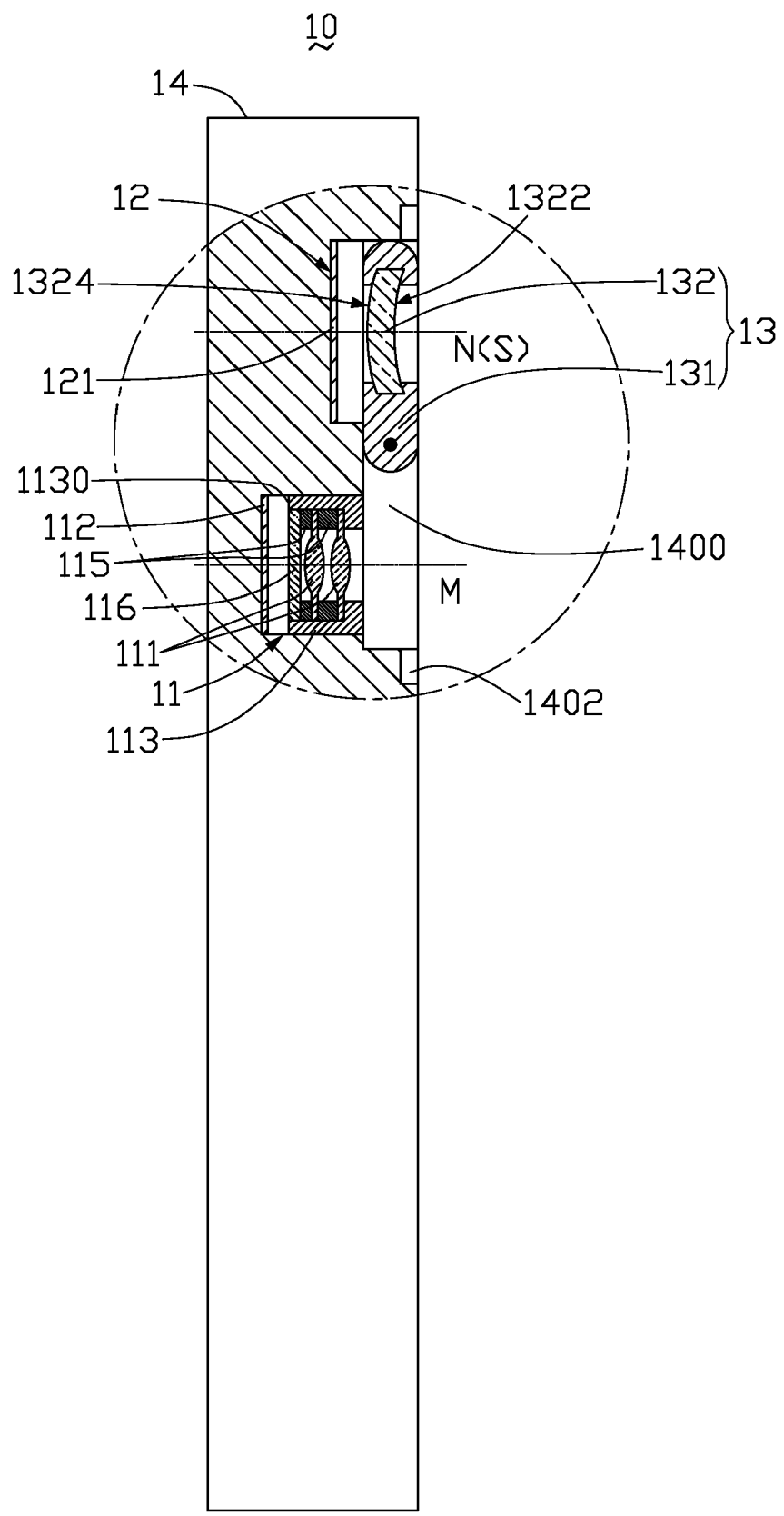
FIG. 4 is similar to FIG. 1, but showing the light diverging lens in optical alignment with the second camera module.

Referring to FIG. 4, by rotating the rotatable module 13, the light diverging lens 132 is shifted to such a position that the light diverging lens 132 is in optical alignment with the second camera module 12 (i.e., the optical axis S of the light diverging lens 132 aligns with an optical axis N of the second camera module 12). With the light diverging lens 132 in this position, the second surface 1324 of the light diverging lens 132 faces the second camera module 12, and the second camera module 12 is capable of forming an image of an object. The second camera module 12 coupling with the light diverging lens 132 can be a still camera or a video camera. In the present embodiment, the second camera module 12 coupling with the light diverging lens 132 is a Video Graphics Array (VGA) video camera. Thus, the user can perform video communication using the second camera module 12.

In operation, by rotating the pin-jointed structure 131, the light diverging lens 132 is rotated clockwise or counterclockwise to a first position or a second position. When the light diverging lens 132 is located at the first position, the light diverging lens 132 is in optical alignment with the first camera module 11, thus greatly increasing the view angle of the first camera module 11. Accordingly, with the light diverging lens 132 being in optical alignment the first camera module 11, the first camera module 11 is capable of taking wide angle images. When the light diverging lens 132 is located at the second position, the light diverging lens 13 is in optical alignment with the second camera module 12, thus the user can perform video communication using the second camera module 12.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A portable electronic device comprising:
a main body;
a first camera module disposed in the main body;
a second camera module disposed in the main body adjacent to the first camera module; and
a light diverging lens rotatably mounted on the main body, the light diverging lens having a first surface and an opposite second surface, the light diverging lens being rotatable between a first position where the light diverging lens is optically aligned with the first camera module and the first surface thereof faces the first camera module, and a second position where the light diverging lens is optically aligned with the second camera module and the second surface thereof faces the second camera module.

2. The portable electronic device as claimed in claim 1, wherein the first camera module comprises a lens group and an image sensor coaxially aligned with the lens group.

3. The portable electronic device as claimed in claim 2, wherein the image sensor is a CCD sensor or a CMOS sensor.

4. The portable electronic device as claimed in claim 2, wherein the first camera module comprises a barrel receiving the lens group therein.

5. The portable electronic device as claimed in claim 2, wherein the first camera module comprises an infrared-cut filter positioned between the lens group and the image sensor.

6. The portable electronic device as claimed in claim 2, wherein the lens group of the first camera module comprises two adjacent lenses and a spacer sandwiched between the adjacent lenses.

7. The portable electronic device as claimed in claim 1, wherein the second camera module comprises an image sensor.

8. The portable electronic device as claimed in claim 7, wherein the image sensor is a CCD sensor or a CMOS sensor.

9. The portable electronic device as claimed in claim 1, wherein the main body comprises a surface and a recess defined in the surface thereof, the light diverging lens being received in the recess.

10. The portable electronic device as claimed in claim 1, wherein the light diverging lens is an aspherical lens.

11. The portable electronic device as claimed in claim 1, wherein the light diverging lens is a concave lens.

12. The portable electronic device as claimed in claim 1, further comprising a pin-jointed structure rotatably mounted on the main body, the light diverging lens being mounted in the pin-jointed structure.

13. A portable electronic device comprising:
a main body;
a first camera module disposed in the main body;
a second camera module disposed in the main body adjacent to the first camera module; and
an aspherical lens rotatably mounted on the main body, the aspherical lens having a first surface and an opposite second surface, the aspherical lens being rotatable between a first position where the aspherical lens is optically aligned with the first camera module and the first surface thereof faces the first camera module, and a second position where the aspherical lens is optically aligned with the second camera module and the second surface thereof faces the second camera module.

14. The portable electronic device as claimed in claim 13, wherein the aspherical lens is a light diverging lens.

15. The portable electronic device as claimed in claim 13, wherein the aspherical lens is a concave lens.

16. The portable electronic device as claimed in claim 13, further comprising a pin-jointed structure rotatably mounted on the main body, the aspherical lens being mounted in the pin-jointed structure.

* * * * *